United States Patent
Hou et al.

(10) Patent No.: US 9,646,157 B1
(45) Date of Patent: May 9, 2017

(54) SYSTEMS AND METHODS FOR IDENTIFYING REPACKAGED FILES

(71) Applicant: Symantec Corporation, Mountain View, CA (US)

(72) Inventors: Zhengqing Hou, Marine Crescent (SG); Jiang Dong, Dawn Ville (SG)

(73) Assignee: Symantec Corporation, Mountain View, CA (US)

( * ) Notice: Subject to any disclaimer, the term of this patent is extended or adjusted under 35 U.S.C. 154(b) by 13 days.

(21) Appl. No.: 14/644,732

(22) Filed: Mar. 11, 2015

(51) Int. Cl.
*G06F 11/00* (2006.01)
*G06F 21/56* (2013.01)

(52) U.S. Cl.
CPC ...... *G06F 21/565* (2013.01); *G06F 2221/033* (2013.01)

(58) Field of Classification Search
CPC . H04L 67/125; G06F 21/565; G06F 2221/033
See application file for complete search history.

(56) References Cited

U.S. PATENT DOCUMENTS

2014/0082729 A1* 3/2014 Shim ................ G06F 21/51 726/23

OTHER PUBLICATIONS

Zhauniarovich, Yuri et al., "FSquaDRA: Fast Detection of Repackaged Applications", http://www.zhauniarovich.com/files/talks/FSquaDRA_DBSec2014.pdf, as accessed Jan. 16, 2015, (On or before Jan. 16, 2015).
Schulz, Patrick et al., "Android Reverse Engineering & Defenses", https://bluebox.com/wp-content/uploads/2013/05/AndroidREnDefenses201305.pdf, as accessed Jan. 16, 2015, Bluebox Labs, (May 2013).
Jung, Jin-Hyuk et al., "Repackaging Attack on Android Banking Applications and Its Countermeasures", http://download.springer.com/static/pdf/161/art%253A10.1007%252Fs11277-013-1258-x.pdf?auth66=1427506966_b4dfe3e405591f34711a074998ee85a7&ext=.pdf, as accessed Jan. 16, 2015, (Jun. 4, 2013).
Crussell, Jonathan et al., "Attack of the Clones: Detecting Cloned Applications on Android Markets", http://web.cs.ucdavis.edu/~hchen/paper/esorics2012.pdf, as accessed Jan. 16, 2015, ESORICS 2012, LNCS 7459, (2012).

(Continued)

*Primary Examiner* — Farid Homayounmehr
*Assistant Examiner* — Suman Debnath
(74) *Attorney, Agent, or Firm* — FisherBroyles, LLP

(57) ABSTRACT

A computer-implemented method for identifying repackaged files may include (1) identifying an application package that packages files for a mobile device application that is to be executed through a mobile device operating system, (2) identifying, within the application package, a resource file that identifies resources for the application package defined in a programming language for the mobile device operating system, (3) parsing the resource file to identify a flag for a resource that specifies whether the resource is public, (4) determining that the flag for the resource has been set as public, and (5) classifying the application package as repackaged based at least in part on the determination that the flag for the resource has been set as public. Various other methods, systems, and computer-readable media are also disclosed.

18 Claims, 7 Drawing Sheets

(56) References Cited

OTHER PUBLICATIONS

Lui, John C., et al., "ADAM: An Automatic & Extensible Platform to Stress Test Android Anti-Virus Systems", http://www.syssec-project.eu/m/page-media/56/zheng-dimva12.pdf, as accessed Jan. 16, 2015, (on or before Jan. 16, 2015).

Vidas, Timothy et al., "Sweetening Android Lemon Markets: Measuring and Curbing Malware in Application Marketplaces", https://www.cylab.cmu.edu/files/pdfs/tech_reports/CMUCyLab11012.pdf, as accessed Jan. 16, 2015, CMU-CyLab-11-012, CyLab, Carnegie Mellon University, Pittsburgh, PA, (Nov. 16, 2011).

"What is the use of the res/values/public.xml file on Android?", http://stackoverflow.com/questions/9348614/what-is-the-use-of-the-res-values-public-xml-file-on-android, as accessed Jan. 16, 2015, (Feb. 19, 2012).

"How does the mapping between android resources and resources ID work?", http://stackoverflow.com/questions/6517151/how-does-the-mapping-between-android-resources-and-resources-id-work, as accessed Jan. 16, 2015, (Jun. 29, 2011).

"Language localisation", http://en.wikipedia.org/wiki/Language_localisation, as accessed Jan. 16, 2015, Wikipedia, (Sep. 13, 2006).

* cited by examiner

```
Program
502 class ApkToolRepackageChecker (RepackageChecker):
        def _init_(self):
                RepackageChecker._init_(self)

def check(self, context):
                if not context.resources:
                        return False apk_sources = context.resources
                for package in apk_sources.get_packages():
                        package_resource = context.resources.get_pacakge_resources(package)
                        type_resources = package_resource.get_type_resources()
                        for type_resource in type_resources:
                                for spec_resource in type_resource.get_spec_resources():
                                        if spec_resource.is_public():
                                                return True return False
```

*FIG. 5*

SYSTEMS AND METHODS FOR IDENTIFYING REPACKAGED FILES

BACKGROUND

As mobile devices become more common, individuals and organizations are becoming increasingly vulnerable to security threats that target those devices. For example, users of ANDROID and APPLE smart phones often download new applications from online distribution platforms, such as the GOOGLE PLAY STORE and APPLE APP STORE. Attackers may attempt to compromise the security of various mobile devices by uploading malicious applications to these online distribution platforms. For example, attackers may obtain an application that is popular and non-malicious. The attackers may then modify the application to insert malicious code or otherwise create a security threat for the end-user. Accordingly, security vendors are seeking systems and methods to better identify and prevent the security threats.

For ease of distribution, mobile device applications may be packaged within an aggregated package file. The aggregated package file may group various files for the application together while also compressing the size of those files. To upload a modified and malicious version of an application, attackers may first repackage the files that are associated with that malicious version of the application. Nevertheless, security vendors may not always be able to conveniently determine whether an application has been repackaged. Accordingly, the instant disclosure identifies and addresses a need for additional and improved systems and methods for identifying repackaged files.

SUMMARY

As will be described in greater detail below, the instant disclosure generally relates to systems and methods for identifying repackaged files by, for example, checking a flag within a resource file to determine whether the flag has been set as public. In one example, a computer-implemented method for identifying repackaged files may include (1) identifying an application package that packages files for a mobile device application that is to be executed through a mobile device operating system, (2) identifying, within the application package, a resource file that identifies resources for the application package defined in a programming language for the mobile device operating system, (3) parsing the resource file to identify a flag for a resource that specifies whether the resource is public, (4) determining that the flag for the resource has been set as public, and (5) classifying the application package as repackaged based at least in part on the determination that the flag for the resource has been set as public.

In some examples, the computer-implemented method may further include classifying the application package as malware based at least in part on the classification of the application package as repackaged. In one embodiment, the application package may be hosted on a digital distribution platform that serves as an application store for the mobile device operating system.

In some examples, classifying the application package as repackaged may be performed without comparing the application package to another application package. In one embodiment, the resource file may assign the resource a unique numerical identifier.

In one embodiment, the resource file was generated by an asset packaging tool for the mobile device operating system. Moreover, parsing the resource file may be performed by the asset packaging tool. In one embodiment, the asset packaging tool generated the resource file by compiling resource definitions from at least one extended markup language file into the resource file. In a further embodiment, the resource file may include a binary file.

In one embodiment, the flag being set to public indicates that the resource is defined in a public extended markup language file. Additionally, or alternatively, the flag being set to public may also indicate that the identifier for the resource is prevented from changing between builds of the application package.

In some examples, identifying the flag may include identifying a keyword that corresponds to the flag. In further examples, identifying the keyword may include identifying a spec resource keyword that establishes the identity of the resource. Additionally, or alternatively, identifying the keyword may include identifying a resource keyword that specifies attributes for processing the resource according to one of a default state and an alternative state. In a further embodiment, identifying the flag, set as public, as corresponding to the spec resource keyword may function as a sufficient trigger to classify the application package as repackaged.

In some examples, the computer-implemented method may further include checking whether a flag for the resource has been set as public within a different version of the application package. In further examples, classifying the application package as repackaged may also be based on a determination that a creator of the application package set the flag as public by switching the flag to public from the different version of the application package.

In some examples, classifying the application package as repackaged may be performed based on a repackaging score. In further examples, classifying the application package as repackaged may be performed by comparing the repackaging score to a threshold score. In one embodiment, the repackaging score may be based on a proportion of flags for the resource that are set as public.

In one embodiment, a system for implementing the above-described method may include (1) an identification module, stored in memory, that (A) identifies an application package that packages files for a mobile device application that is to be executed through a mobile device operating system and (B) identifies, within the application package, a resource file that identifies resources for the application package defined in a programming language for the mobile device operating system, (3) a parsing module, stored in memory, that parses the resource file to identify a flag for a resource that specifies whether the resource is public, (4) a determination module, stored in memory, that determines that the flag for the resource has been set as public, (5) a classification module, stored in memory, that classifies the application package as repackaged based at least in part on the determination that the flag for the resource has been set as public, and (6) at least one physical processor configured to execute the identification module, the parsing module, the determination module, and the classification module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) identify an application package that packages files for a mobile device application that is to be executed through a mobile device operating system, (2) identify, within the application package, a resource file that identifies resources for the application package defined in a programming language for the mobile device operating system, (3) parse the resource file to identify a flag for a resource that specifies whether the resource is public, (4) determine that the flag for the resource has been set as public, and (5) classify the application package as repackaged based at least in part on the determination that the flag for the resource has been set as public.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 5 is a block diagram of an exemplary program for identifying repackaged files.

Figure 1:
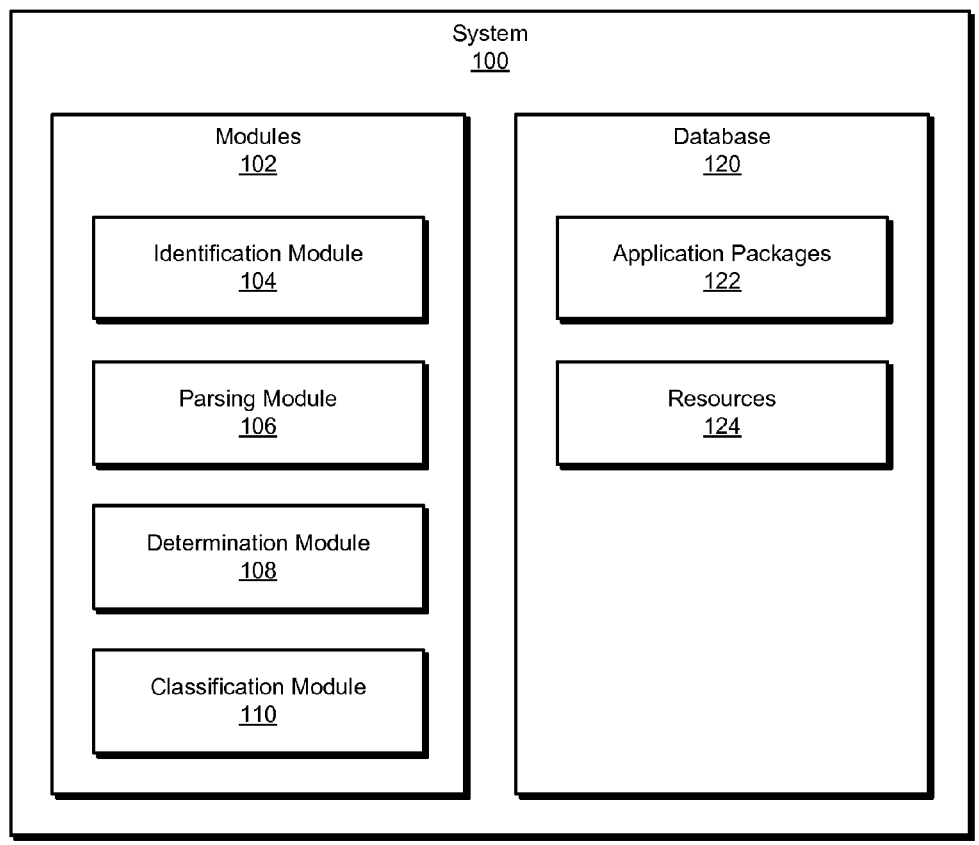
FIG. 1 is a block diagram of an exemplary system for identifying repackaged files.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for identifying repackaged files. As will be explained in greater detail below, the disclosed systems and methods may enable users and security vendors to more easily and conveniently identify repackaged files. Notably, the disclosed systems and methods may also enable users and security vendors to identify the repackaged files without comparing those files to other files (e.g., without comparing the repackaged file with an original package file). In some examples, the disclosed systems and methods may classify the file as malicious based at least in part on a classification of the file as repackaged.

Figure 2:
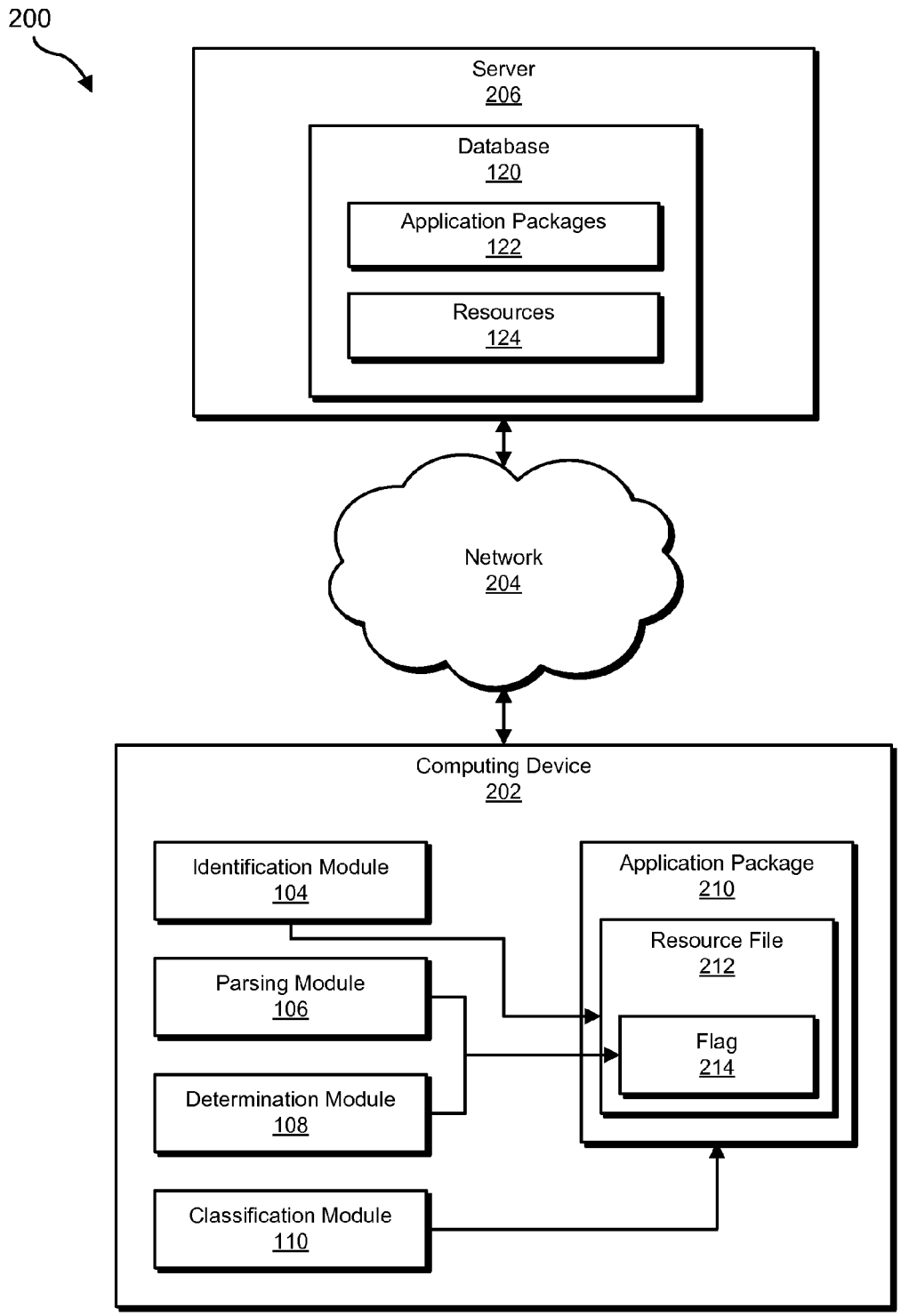
FIG. 2 is a block diagram of an additional exemplary system for identifying repackaged files.

The following will provide, with reference to FIGS. 1-2, detailed descriptions of exemplary systems for identifying repackaged files. Detailed descriptions of corresponding computer-implemented methods will also be provided in connection with FIGS. 3-5. In addition, detailed descriptions of an exemplary computing system and network architecture capable of implementing one or more of the embodiments described herein will be provided in connection with FIGS. 6 and 7, respectively.

FIG. 1 is a block diagram of exemplary system 100 for identifying repackaged files. As illustrated in this figure, exemplary system 100 may include one or more modules 102 for performing one or more tasks. For example, and as will be explained in greater detail below, exemplary system 100 may also include an identification module 104 that may identify an application package that packages files for a mobile device application that is to be executed through a mobile device operating system. Identification module 104 may also identify, within the application package, a resource file that identifies resources for the application package defined in a programming language for the mobile device operating system.

Exemplary system 100 may additionally include a parsing module 106 that may parse the resource file to identify a flag for a resource that specifies whether the resource is public. Exemplary system 100 may also include a determination module 108 that may determine that the flag for the resource has been set as public. Exemplary system 100 may additionally include a classification module 110 that may classify the application package as repackaged based at least in part on the determination that the flag for the resource has been set as public. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or server 206), computing system 610 in FIG. 6, and/or portions of exemplary network architecture 700 in FIG. 7. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may be configured to store application packages 122, which may include both original application packages, repackaged application packages, and/or application packages under evaluation. Database 120 may also be configured to store resources 124, which may include resources defined in a programming language for the mobile device operating system, as discussed further below.

Database 120 may represent portions of a single database or computing device or a plurality of databases or computing devices. For example, database 120 may represent a portion of server 206 in FIG. 2, computing system 610 in FIG. 6, and/or portions of exemplary network architecture 700 in FIG. 7. Alternatively, database 120 in FIG. 1 may represent one or more physically separate devices capable of being accessed by a computing device, such as server 206 in FIG. 2, computing system 610 in FIG. 6, and/or portions of exemplary network architecture 700 in FIG. 7.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a server 206 via a network 204. In one example, computing device 202 may be programmed with one or more of modules 102 and/or may store all or a portion of the data in database 120. Additionally or alternatively, server 206 may be programmed with one or more of modules 102 and/or may store all or a portion of the data in database 120.

In one embodiment, one or more of modules 102 from FIG. 1 may, when executed by at least one processor of computing device 202 and/or server 206, cause computing device 202 and/or server 206 to identify repackaged files. For example, and as will be described in greater detail below, identification module 104 may identify an application package 210 that packages files for a mobile device application that is to be executed through a mobile device operating system. Identification module 104 may also identify, within the application package, a resource file 212 that identifies resources for application package 210 defined in a programming language for the mobile device operating system. Parsing module 106 may parse resource file 212 to identify a flag 214 for a resource (such as a resource within resources 124) that specifies whether the resource is public. Determination module 108 may determine that flag 214 for the resource has been set as public. Accordingly, classification module 110 may classify application package 210 as repackaged based at least in part on the determination that flag 214 for the resource has been set as public.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 610 in FIG. 6, or any other suitable computing device.

Server 206 generally represents any type or form of computing device that is capable of storing and/or analyzing application package files. Examples of server 206 include, without limitation, application servers and database servers configured to provide various database services and/or run certain software applications.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 700 in FIG. 7, or the like. Network 204 may facilitate communication or data transfer using wireless or wired connections. In one embodiment, network 204 may facilitate communication between computing device 202 and server 206.

Figure 3:
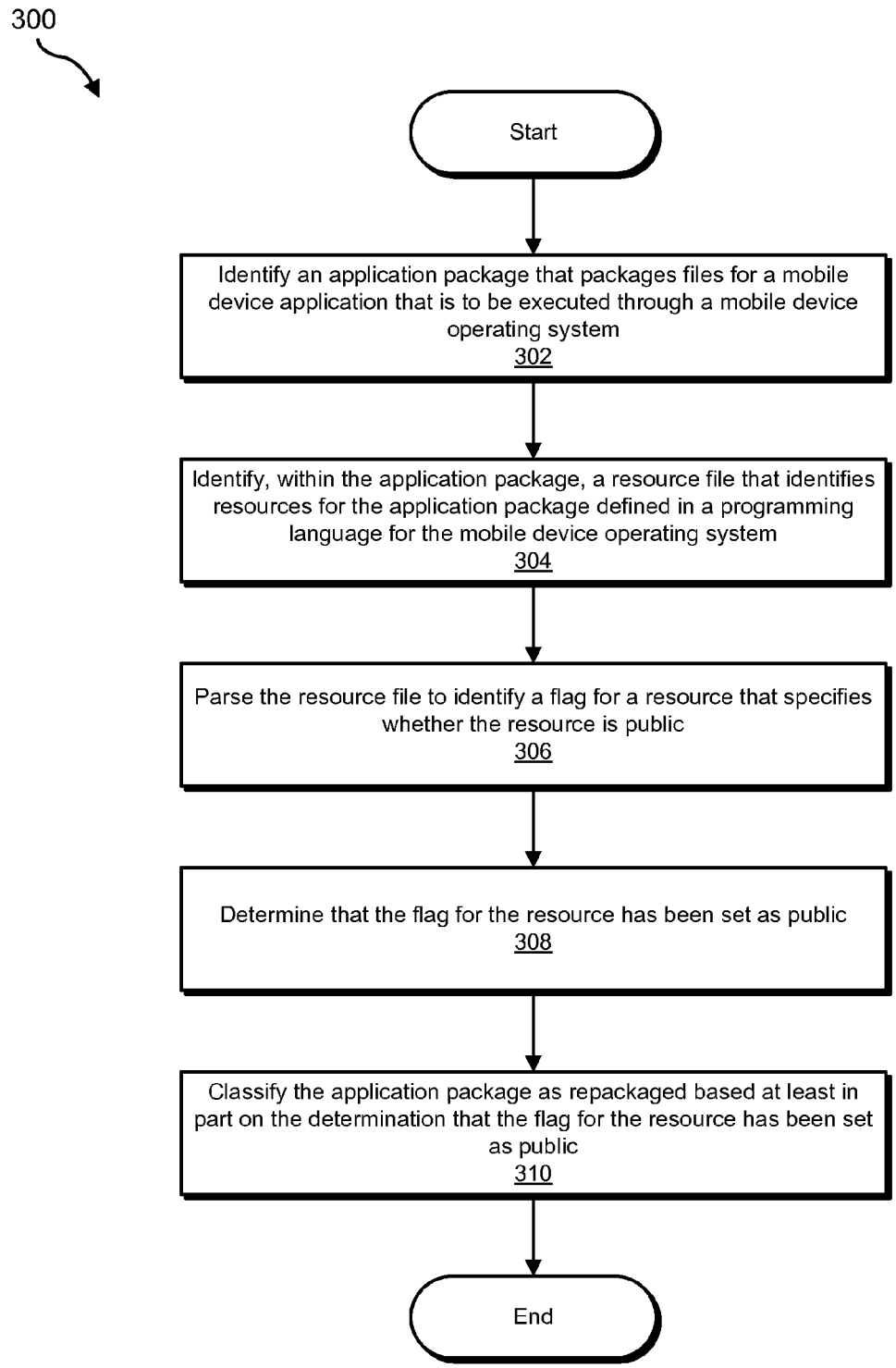
FIG. 3 is a flow diagram of an exemplary method for identifying repackaged files.

FIG. 3 is a flow diagram of an exemplary computer-implemented method 300 for identifying repackaged files. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302, one or more of the systems described herein may identify an application package that packages files for a mobile device application that is to be executed through a mobile device operating system. For example, identification module 104 may, as part of computing device 202 in FIG. 2, identify application package 210 that packages files for a mobile device application that is to be executed through a mobile device operating system.

As used herein, the term "application package" generally refers to an aggregated collection of files or other resources that are associated with an application. Aggregating and/or compressing the collection of files may enable computing systems to conveniently download and transfer the files over a network.

Moreover, as used herein, the term "mobile device application" generally refers to any software or other application provided for the benefit of an end user of a mobile device, such as a smart phone, tablet, and/or laptop. Furthermore, as used herein, the term "mobile device," generally refers to any device designed for convenient carrying and use at multiple locations, rather than being statically associated with a single location or power source, as with a desktop computer. Mobile devices typically have batteries to enable users to conveniently carry the devices without being limited to a single power output.

Moreover, as used herein, the term "mobile device operating system," generally refers to an operating system specifically designed and configured for mobile devices. Exemplary mobile device operating systems include ANDROID and IOS. Similarly, the phrase "that is to be executed through a mobile device operating system," as used herein, generally refers to mobile device applications that are designed or configured for execution on a mobile device operating system.

Identification module 104 may identify the application package in a variety of ways. For example, identification module 104 may identify the application package in response to a user or computing device downloading the application package. Similarly, identification module 104 may identify the application package in response to any other suitable event, including unzipping or unpacking the application package, executing an application that corresponds to the application package, executing a security scan by a security application, and/or selection of the application package by the end user.

In one embodiment, the application package may be hosted on a digital distribution platform that serves as an application store for the mobile device operating system. For example, the application package may be hosted on the GOOGLE PLAY STORE or the APPLE APP STORE, as discussed above.

Returning to FIG. 3, at step 304, one or more of the systems described herein may identify, within the application package, a resource file that identifies resources for the application package defined in a programming language for the mobile device operating system. For example, identification module 104 may, as part of computing device 202 in FIG. 2, identify, within the application package, resource file 212 that identifies resources for application package 210 defined in a programming language for the mobile device operating system.

As used herein, the term "resource file" generally refers to any file that identifies resources for the application package.

Similarly, as used herein, the term "resource," generally refers to content, such as strings and images, that a programmer may place outside of the program to enable the programmer and others to conveniently maintain and modify the content independently of the program itself. In some examples, mobile device operating systems, such as ANDROID, provide specific tools, commands, and/or locations for creating and managing resources.

Moreover, as used herein, the term "programming language for the mobile device operating system," generally refers to a programming language that the mobile device operating system is configured to execute. For example, the programming language for the ANDROID operating system may correspond to JAVA. Similarly, the programming language for the IOS operating system may correspond to SWIFT or OBJECTIVE-C.

Identification module 104 may identify the resource file in a variety of ways. In some examples, identification module 104 may identify the resource file based on a predetermined name and/or file path for the resource file. For example, the resource file may be named "resources" and the file extension may be "arsc." Similarly, the resource file may be located within a "res" directory of the application package. In other examples, a user or other software component may select, or otherwise identify, the resource file.

In one embodiment, the resource file assigns the resource a unique numerical identifier. Moreover, an asset packaging tool for the mobile device operating system may generate the resource file to specify the unique numerical identifier. In some examples, the unique numerical identifier may have the form PPTTNNNN, where PP specifies the package, TT specifies the type of the resource, and NNNN specifies the number or name of the resource in that type.

In further examples, the asset packaging tool may correspond to the ANDROID ASSET PACKAGING TOOL ("AAPT") for the ANDROID operating system. Although these examples focus on AAPT, the disclosed systems and methods may use any asset packaging tool or other tool for parsing the resource file, as discussed below. Moreover, the asset packaging tool may generate the resource file as part of packaging the collection of files associated with the application. Additionally, the same asset packaging tool may perform the parsing of the resource file, as discussed below for step 306 of FIG. 3.

In one embodiment, the asset packaging tool generated the resource file by compiling resource definitions from at least one extended markup language file into the resource file. For example, in the ANDROID operating system, the asset packaging tool may collect resources for the application (such as "layout/main.XML[,]" "drawable/icon.XML[,]" and "layout/listitem.XML") and assign an identifier (e.g., a unique and numeric identifier) to each resource. The asset packaging tool may then generate a binary file that specifies the resource names, their identifiers, and/or their values. Accordingly, the resource file may include or constitute a binary file. The binary file may be formatted in a format (e.g., a device-specific format) that the mobile device may easily memory map (e.g., "mmapped") and parse at runtime.

Notably, the asset packaging tool, such as AAPT, may generally make no effort to persist the same unique numerical identifiers for resources between builds of the application package. Nevertheless, the mobile device operating system, and/or corresponding programming language, may provide a method for ensuring that the identifiers persist and remains static between builds. For example, in the ANDROID operating system, programmers may place resources within a public extended markup language document (e.g., "public.XML") within a specified location (e.g., "res/values"). In one specific example, the public XML document may be formatted as follows:

<?xml version="1.0" encoding="utf-8"?>
<resources>
<public type="string" name="string3" id="0x7f040001"I>
</resources>

Notably, the definition of the resource within the public XML file may specify that the resource is "public" using the keyword "public type," as shown above. The use of the keyword, and/or the use of the name and/or location of the "public.XML" file, may specify that the identifier for the resource will persist and remains static between builds. As described above, the asset packaging tool may compile the resources, as defined in the XML files, into a binary file (e.g., a file containing binary XML) such as "resources.arsc."

At step 306, one or more of the systems described herein may parse the resource file to identify a flag for a resource that specifies whether the resource is public. For example, parsing module 106 may, as part of computing device 202 in FIG. 2, parse resource file 212 to identify flag 214 for a resource that specifies whether the resource is public.

As used herein, the term "flag" generally refers to any bit or bits of information that specify whether a resource is public, as discussed above. Notably, a flag may be encoded within a precompiled resource XML file (e.g., the "public" keyword in the "public.XML" file) and/or a compiled resource file, such as "resources.arsc." Similarly, as used herein, the term "public," generally refers to the setting of resources as public such that an identifier for the resource persists and remains static between builds of an application package. In other words, the flag being set public may indicate that the resource was defined in a public extended markup language file, as discussed above. Additionally, or alternatively, the flag being set public may indicate that the identifier for the resource is prevented from changing between builds of the application package.

Parsing module 106 may parse the resource file in a variety of ways. Because a compiled resource file may be formatted in a binary format, parsing module 106 may use a tool to parse the resource file and read the information included within the resource file. For example, the AAPT may parse "resources.arsc" to identify the flag for the resource that specifies whether the resource is public. For example, parsing module 106 may execute the AAPT using a "–dump" parameter to dump, or extract, values, or other information, for the resources encoded within "resources.arsc." In one specific example, the command may take the form "aapt dump-values resources [application_file_path]."

Figure 4:
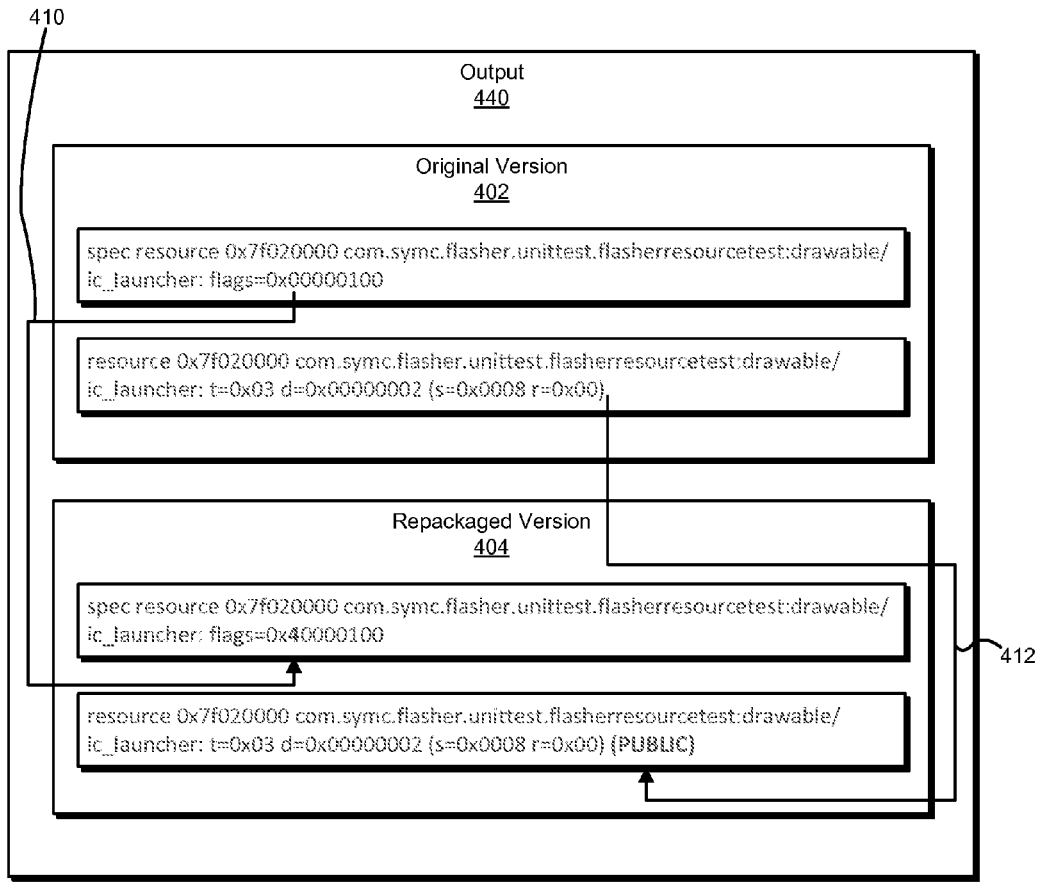
FIG. 4 is a block diagram of exemplary output from the parsing of the resource file.

FIG. 4 shows an example of output 440 from AAPT after parsing "resources.arsc" using the "–dump" parameter to extract information about resources for the application package. As shown in FIG. 4, output 440 may include output for both an original version 402 and a repackaged version 404 of the application package. Notably, although FIG. 4 shows a comparison between original version 402 and repackaged version 404, one benefit of the disclosed systems and methods is that they may detect repackaged application files without performing such a comparison, as discussed further below.

In some examples, identification module 104 may identify the flag by identifying a keyword that corresponds to the flag. For example, identification module 104 may identify a spec resource keyword that establishes the identity of the resource. In the example of FIG. 4, identification module 104 may identify the keyword "spec resource" within the first of the two lines of output shown in original version 402. Similarly, identification module 104 may identify a resource keyword that specifies attributes for processing the resource according to one of a default state and an alternative state. In the example of FIG. 4, identification module 104 may identify the keyword "resource" within the second of the two lines of output shown in original version 402.

In further examples, instances of the resource keyword may follow a configuration keyword (e.g., "config") that may specify either a default state or an alternative state. For example, "config {default}" may specify a default state. Similarly, "config de" may specify the "de" language (i.e., German). Furthermore, "config zh-CN" may specify the "zh-CN" language (i.e., mainland Chinese with simplified characters).

Notably, in the example of a spec resource keyword (such as the "spec resource" keyword in the first line of output in the two lines of output in original version 402), identifying the flags, set as public, as corresponding to the spec resource keyword may function as a sufficient trigger to classify the application package as repackaged. Accordingly, classification module 110 may classify the application package as repackaged based merely on a determination that a flag for the spec resource keyword is set to public, as discussed further below.

For example, when an attacker or programmer modifies an original application package to make a resource public (thereby fixing the identifier for the resource between builds), this change may further cause the flags for both the spec resource keyword and all resource keywords to be set to public. Because all of the flags associated with the resource may have been set public, it can be sufficient to identify a single public flag for the spec resource keyword (e.g., the first "spec resource" or "resource" keyword for the resource encountered when parsing the resource file) or any other resource keyword. In other words, when one or more of modules 102 identify one public flag for the resource, the modules may then assume that all of the other flags for the resource have also been set to public.

At step 308, one or more of the systems described herein may determine that the flag for the resource has been set as public. For example, determination module 108 may, as part of computing device 202 in FIG. 2, determine that flag 214 for the resource has been set as public.

Determination module 108 may determine that the flag for the resource has been set as public in a variety of ways. In the example of FIG. 4, for the spec resource keyword, determination module 108 may check whether a specific flag, within a series of flags, has been toggled. As further shown in FIG. 4, an explanatory arrow 410 starts at a specific position within the "flags" shown in the first line of output within original version 402. That specific position immediately follows the "x" character within the "flags." At the specific position, the flag within original version 402 is set to zero. This particular flag indicates whether the corresponding resource is public or not. As further shown in FIG. 4, explanatory arrow 410 proceeds from the starting position within original version 402 toward the same position within "flags" within the first line of output in repackaged version 404. At the same position within repackaged version 404, the specific character has changed from zero to four. In various embodiments, the specific value of four or, instead, a specific bit toggled within a hexadecimal character (e.g., the second of four bits in binary, or 0100, or "4" in hexadecimal), may constitute the flag that specifies that the resource is public. In the latter case, any hexadecimal character that toggles the second bit within four bits in binary may constitute the flag.

Similarly, determination module 108 may check whether a public keyword, such as "public," follows the keyword within the output from the asset packaging tool. In the example of FIG. 4, an explanatory arrow 412 begins a starting position at the end of the second line of the two lines of output within original version 402. As shown in FIG. 4, the second line of output ends without any public keyword. In contrast, as shown by explanatory arrow 412 that proceeds from original version 402 to a corresponding position at the end of the second line of output within repackaged version 404, the second line of output within repackaged version 404 ends with the keyword "public." As shown in FIG. 4, a creator of the application package set the flags as public by switching the flags to public from original version 402 of the application package, in which the flags are not set as public.

FIG. 5 shows an illustrative program 502, in the PYTHON programming language, for checking whether application packages have been repackaged. Program 502 is merely exemplary and any suitable program, formula, and/or algorithm may be used, based on the steps of FIG. 3, to check whether application packages have been repackaged. In the example of FIG. 5, the Python function block "check" takes as inputs an instance of the class ApkToolRepackageChecker and also a data structure named "context." The data structure "context" may refer to a data structure generated by parsing the resource file (e.g., using AAPT to dump resource values from resources.arsc) and then running another program to crawl through the parsed output and extract relevant information about resources and flags. The data structure "context" may include information about resource keywords and flags extracted from the resource file, which the PYTHON program may access by referencing "context.resources," as shown in FIG. 5.

The function block "check" begins by checking whether "context" contains any resource keywords ("if not context.resources:" and "return False"). If "context" includes at least one resource keyword, then the function block "check" proceeds by checking, for every package within "context," whether the resource keyword constitutes a spec resource keyword, as discussed above ("for type_resource in type_resources:" and "for spec_resource in type_resource.get_spec_resources( )"). For every spec resource keyword within the "context" data structure, the function block "check" then checks whether the corresponding flag for the spec resource keyword has been set as public ("if spec_resource.is_public( ):" and "return True"). If any spec resource keyword has a corresponding flag that has been set as public, then the function block "check" returns a value of true, indicating that the corresponding application package has been repackaged. Otherwise, the function block "check" returns a value of false.

Notably, these examples based on the ANDROID operating system and the AAPT are merely exemplary. As discussed above, any bits or sequence of bits, or other data, can constitute the flag that specifies that the resource is public, so long as the system (e.g., the mobile device) is configured to recognize the bit or sequence of bits as the flag.

At step 310, one or more of the systems described herein may classify the application package as repackaged based at least in part on the determination that the flag for the resource has been set as public. For example, classification module 110 may, as part of computing device 202 in FIG. 2, classify application package 210 as repackaged based at least in part on the determination that flag 214 for the resource has been set as public.

Classification module 110 may classify the application package as repackaged in a variety of ways. For example, classification module 110 may toggle a bit or sequence of bits within a system or configuration that recognizes the toggled bit as an indication that the corresponding application package has been repackaged. In particular, classification module 110 may associate the application, or an identifier for the application, with an indication that the application package has been repackaged within a database or data structure that includes a field for indicating whether the corresponding application package has been repackaged. For illustration purposes, the database may include two columns, where one column includes identifiers for application packages and the other column includes indications of whether those application packages have been repackaged. The database may associate application package identifiers with corresponding indications of whether the application packages have been repackaged along the same row between the two columns. Nevertheless, this is merely one example for illustration purposes, and the disclosed systems and methods may use any suitable technique, database, or data structure for recognizing, categorizing, and/or indicating that an application package has been repackaged.

In some examples, classification module 110 may classify, as a sufficient trigger, the application package as repackaged based upon identifying a single flag for the resource that has been set as public. In a more specific example, classification module 110 may classify, as a sufficient trigger, the application package as repackaged based upon identifying a single flag for a spec resource keyword that has been set as public, as discussed above. In other examples, classification module 110 may classify the application package as repackaged based on a repackaging score. For example, the repackaging score may be based on an amount, and/or proportion, of flags for a resource that are set as public. Similarly, the repackaging score may be based on an amount, and/or proportion, of flags for a multitude of resources that are set as public. In one specific example, classification module 110 may classify the application package as repackaged based at least in part on comparing the repackaging score to a threshold score.

Classification module 110 may also classify the application package as repackaged based on a comparison between the application package, such as repackaged version 404, and a different version of the application package, such as original version 402. Upon determining that repackaged version 404 has switched one or more flags to public from original version 402, classification module 110 may use that determination as an additional factor or input (e.g., in addition to disclosing that the flag is set as public in repackaged version 404) into a formula or algorithm for evaluating whether the application package is repackaged and/or constitutes malware. Alternatively, classification module 110 may classify the application package as repackaged without performing a comparison (e.g., based purely on an analysis of the application package without inspecting or parsing other application packages or versions of application packages).

Notably, repackaged applications may be more likely to constitute malware. Moreover, ordinary mobile device application packages typically do not set one or more resources as public, as discussed above. Rather, the particular feature of setting resources as public (i.e., to prevent identifiers for the resources from changing between builds of the corresponding application packages) is a relatively rare and obscure feature that ordinary programmers typically do not use. Accordingly, in some examples, classification module 110 may further classify the application package as malware based at least in part (or entirely) on the classification of the application package as repackaged. Of course, the classification of the application package as repackaged may constitute merely one factor or input into a multitude of factors or inputs that classification module 110 may consider when evaluating whether to classify the application package as malware. For example, classification module 110 may also consider any other suitable factor or input that indicates, or tends to indicate, whether the corresponding application package constitutes malware. In specific examples, classification module 110 may use any suitable weighted or nonweighted, algebraic, Boolean, and/or business logic, which may take a variety of items of information as inputs, to evaluate whether the application package constitutes malware. In these examples, the classification of the application package as repackaged may be weighted more or less according to a predefined and/or adjusted weight, which may be based upon a statistical analysis, or other analysis, tending to indicate how reliable, or meaningful, the repackaging of an unknown application package is when considering whether the unknown application package constitutes malware. After classification module 110 has classified the application package as malware, a software security system may perform any suitable remedial or protective action in the same manner that the software security system would react to any other detection of malware or security threats.

As explained above in connection with method 300 in FIG. 3, the disclosed systems and methods may enable users and security vendors to more easily and conveniently identify repackaged files. Notably, the disclosed systems and methods may also enable users and security vendors to identify the repackaged files without comparing those files to other files (e.g., without comparing the repackaged file with an original package file). In some examples, the disclosed systems and methods may classify the file as malicious based at least in part on a classification of the file as repackaged.

Figure 6:
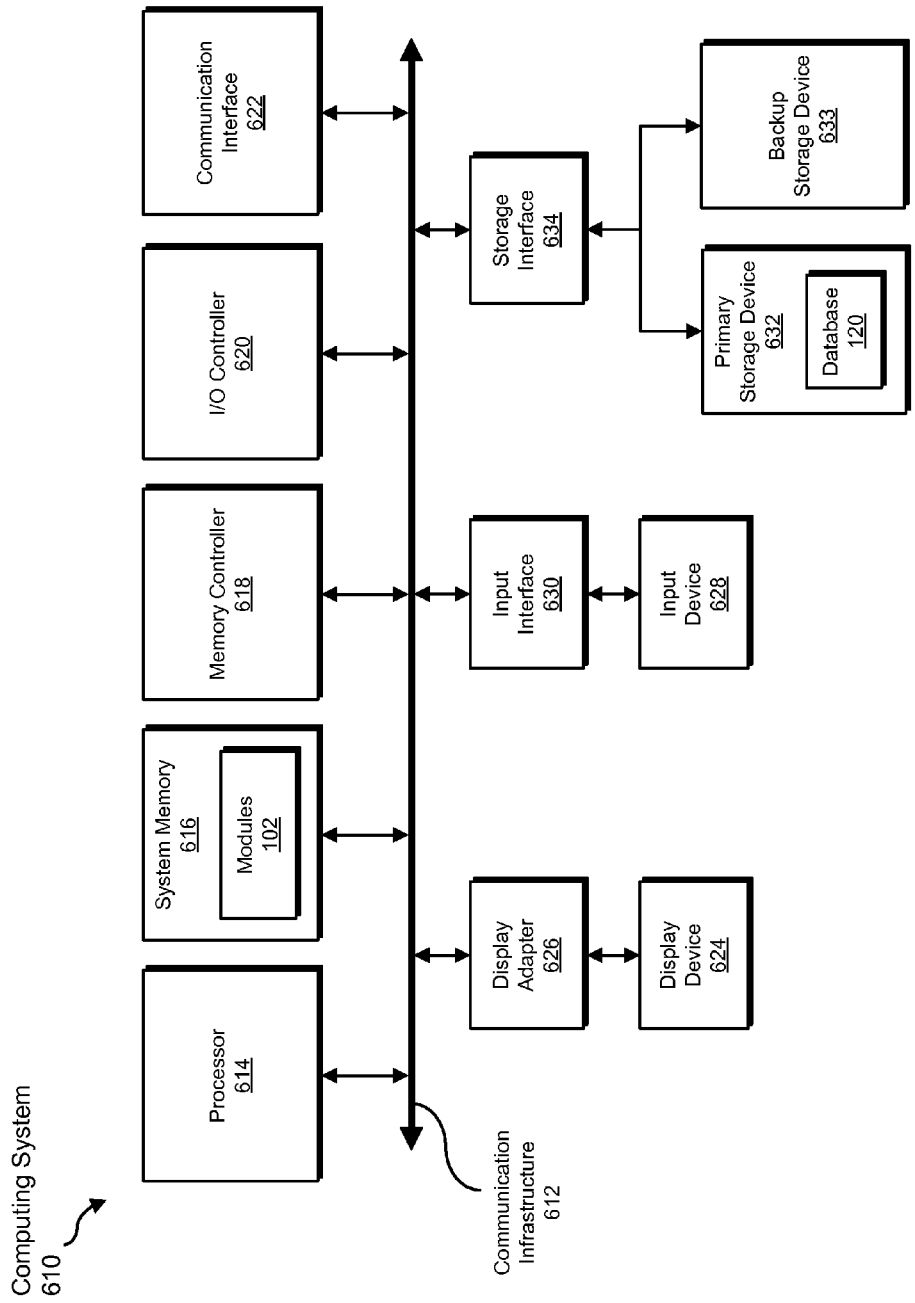
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, database 120 from FIG. 1 may be stored in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
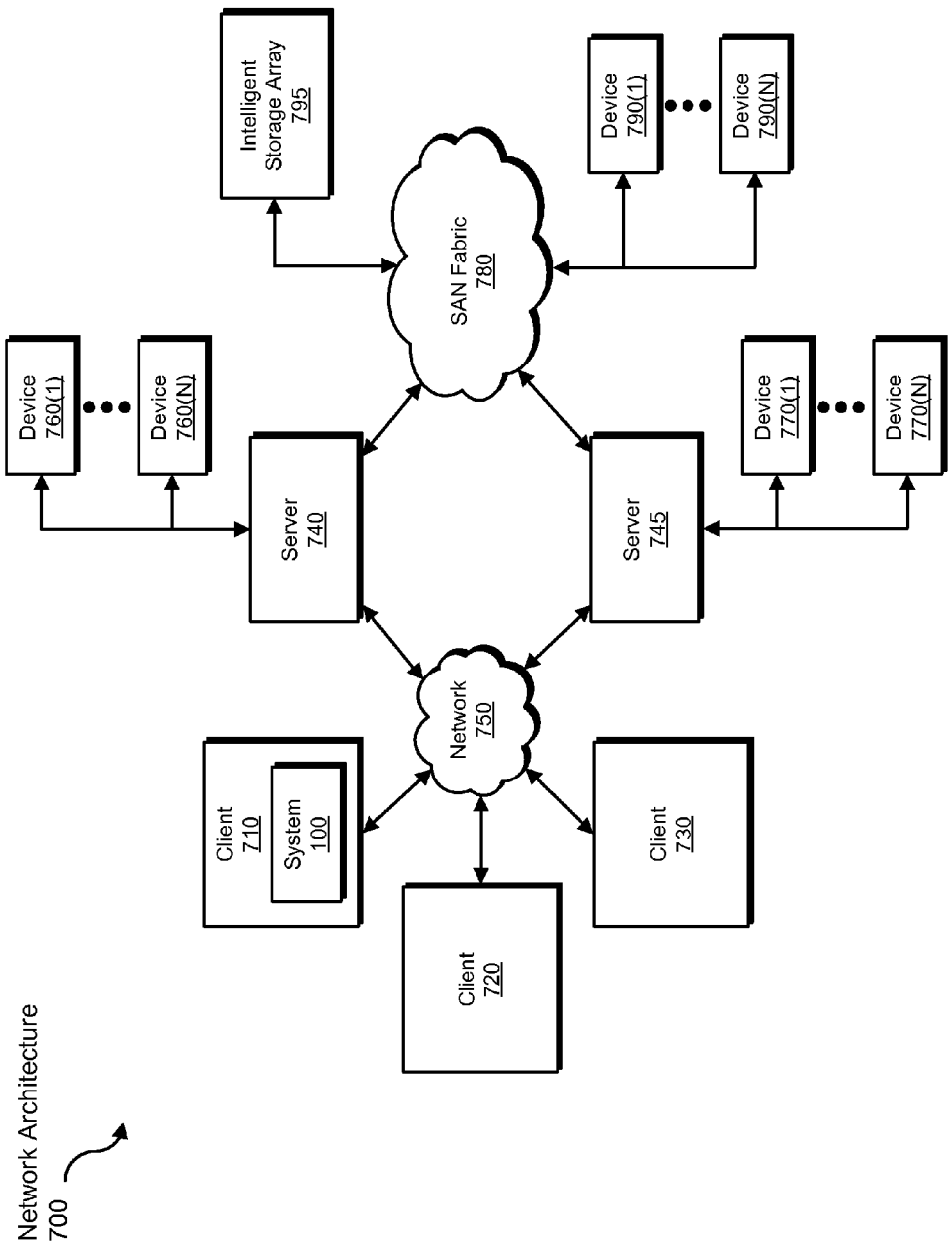
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for identifying repackaged files.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the phrase "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the phrase "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the phrase "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive an application package and/or package classification to be transformed, transform one or more of these items of data, output a result of the transformation to an output device, display, or storage, use the result of the transformation to protect users from malicious repackaged files, and store the result of the transformation to a memory or storage. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for identifying repackaged files, at least a portion of the method being performed by a computing device comprising at least one processor, the method comprising:
    identifying an application package that packages files for a mobile device application that is to be executed through a mobile device operating system;
    identifying, within the application package, a resource file that identifies resources for the application package defined in a programming language for the mobile device operating system;
    parsing the resource file to identify a flag for a resource that specifies whether the resource is public;
    determining that the flag for the resource has been set as public, the setting of the flag as public indicating that an identifier for the resource is prevented from changing between builds of the application package;
    classifying the application package as repackaged based at least in part on the determination that the flag for the resource has been set as public.

2. The computer-implemented method of claim 1, further comprising classifying the application package as malware based at least in part on the classification of the application package as repackaged and performing a protective action, based on the classification of the application package as malware, to protect a computing system from the application package.

3. The computer-implemented method of claim 1, wherein the application package is hosted on a digital distribution platform that serves as an application store for the mobile device operating system.

4. The computer-implemented method of claim 1, wherein classifying the application package as repackaged is performed without comparing the application package to another application package.

5. The computer-implemented method of claim 1, wherein the resource file assigns the resource a unique numerical identifier.

6. The computer-implemented method of claim 5, wherein:
    the resource file was generated by an asset packaging tool for the mobile device operating system;
    parsing the resource file is performed by the asset packaging tool.

7. The computer-implemented method of claim 6, wherein the asset packaging tool generated the resource file by compiling resource definitions from at least one extended markup language file into the resource file.

8. The computer-implemented method of claim 6, wherein the resource file comprises a binary file.

9. The computer-implemented method of claim 6, wherein the flag being set to public indicates that the resource is defined in a public extended markup language file.

10. The computer-implemented method of claim 1, wherein identifying the flag comprises identifying a keyword that corresponds to the flag.

11. The computer-implemented method of claim 10, wherein identifying the keyword comprises at least one of:
    identifying a spec resource keyword that establishes the identity of the resource;
    identifying a resource keyword that specifies attributes for processing the resource according to one of a default state and an alternative state.

12. The computer-implemented method of claim 11, wherein:
    identifying the resource keyword comprises identifying the spec resource keyword;
    identifying the flag as corresponding to the spec resource keyword functions as a sufficient trigger to classify the application package as repackaged.

13. The computer-implemented method of claim 1, further comprising checking whether a flag for the resource has been set as public within a different version of the application package.

14. The computer-implemented method of claim 13, wherein classifying the application package as repackaged is further based on a determination that a creator of the application package set the flag as public by switching the flag to public from the different version of the application package.

15. The computer-implemented method of claim 1, wherein classifying the application package as repackaged is performed based on a repackaging score.

16. The computer-implemented method of claim 15, wherein classifying the application package as repackaged is performed by comparing the repackaging score to a threshold score.

17. The computer-implemented method of claim 15, wherein the repackaging score is based on a proportion of flags for the resource that are set as public.

18. A non-transitory computer-readable medium comprising one or more computer-readable instructions that, when executed by at least one processor of a computing device, cause the computing device to:
    identify an application package that packages files for a mobile device application that is to be executed through a mobile device operating system;
    identify, within the application package, a resource file that identifies resources for the application package defined in a programming language for the mobile device operating system;
    parse the resource file to identify a flag for a resource that specifies whether the resource is public;
    determine that the flag for the resource has been set as public, the setting of the flag as public indicating that an identifier for the resource is prevented from changing between builds of the application package;

classify the application package as repackaged based at least in part on the determination that the flag for the resource has been set as public.

* * * * *